No. 786,441. PATENTED APR. 4, 1905.
B. HUNT.
GRAVITY FILTER.
APPLICATION FILED AUG. 4, 1904.
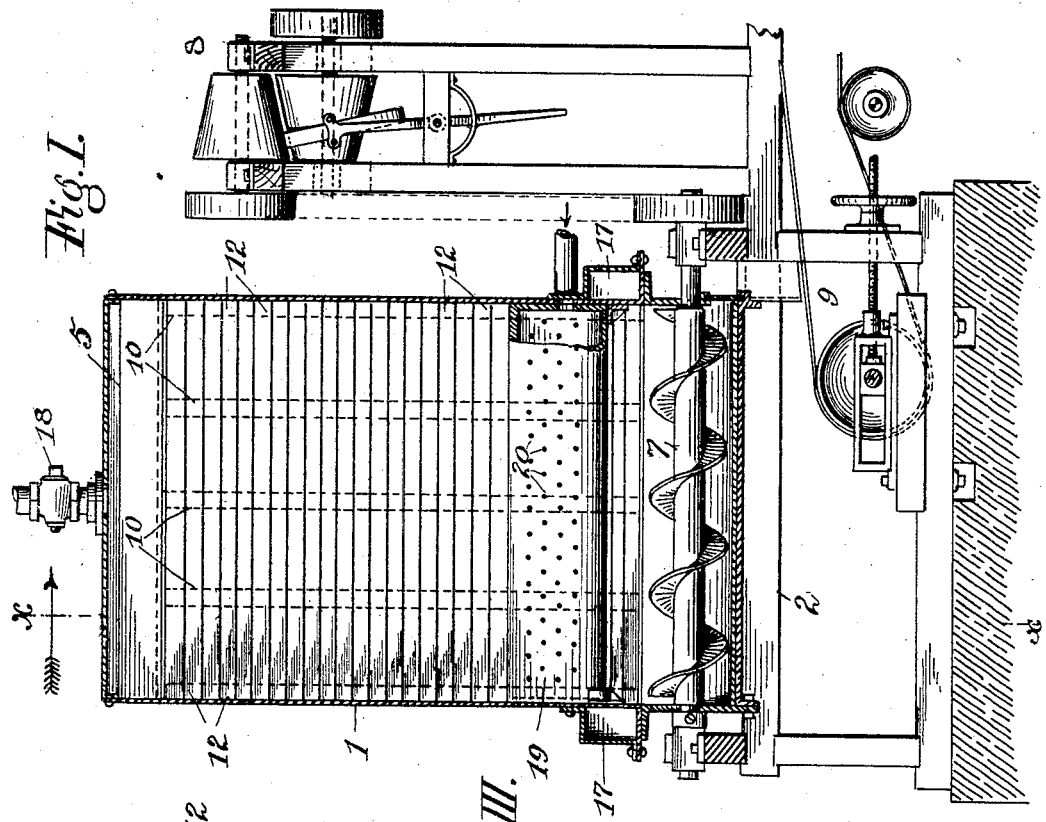
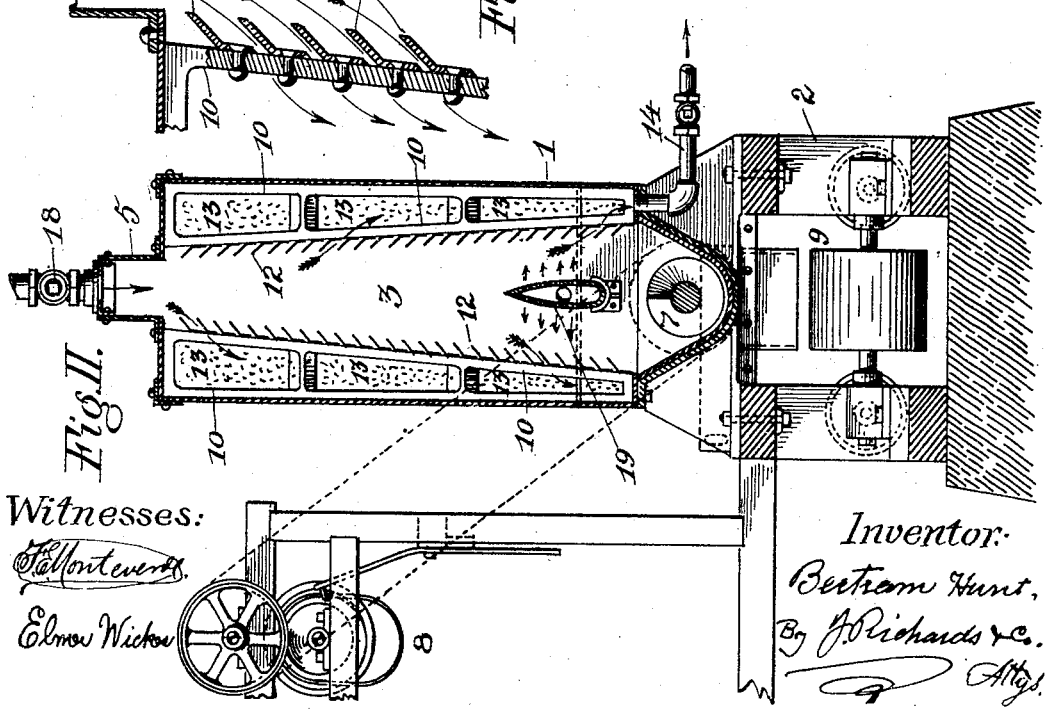
Witnesses:
Inventor:
Bertram Hunt,
By J. Richards &Co.
Attys.

No. 786,441. Patented April 4, 1905.

UNITED STATES PATENT OFFICE.

BERTRAM HUNT, OF SAN FRANCISCO, CALIFORNIA.

GRAVITY-FILTER.

SPECIFICATION forming part of Letters Patent No. 786,441, dated April 4, 1905.

Application filed August 4, 1904. Serial No. 219,557.

*To all whom it may concern:*

Be it known that I, BERTRAM HUNT, a subject of the King of Great Britain, residing at San Francisco, county of San Francisco, and State of California, have invented certain new and useful Improvements in Gravity-Filters; and I hereby declare the following to be a full, clear, and exact description of the same, reference being had to the accompanying drawings, forming a part of this specification.

This invention relates to apparatus for filtering or extracting water or other liquids from comminuted material, such as crushed ore and the like, and in certain useful improvements in such apparatus, as hereinafter described, and illustrated by a drawing that forms a part of this specification.

My improvements consist in disposing the material to be filtered or drained in a vertical mass, preferably of pyramidal form, of sufficient height to cause compression thereof by its own gravity, and preferably with inclination on the sides sufficient to overcome adhesion or friction, and permit the mass to descend as fast as it is drained or filtered.

My improvement also consists in a controllable means of removing from the base of the mass of material by mechanical appliances a quantity equal to that supplied at the top, so the head and pressure will remain approximately uniform, and, further, consists in a series of inwardly-inclined surfaces or arresting devices attached to the walls of the retaining-chamber, whereby filtering material is retained and water exuding from the mass is directed away from the same and through the filtering medium.

My invention further includes, but not essentially, devices for resaturating the material with water while under treatment to wash out chemical solutions, if any are held therein.

The principal objects of my invention are to filter or extract water from crushed ore, commonly called "pulp," also to remove solutions as in the cyanid method of gold extraction, and as a principal object to prevent the waste of water by its reuse in cases where the supply is limited.

To these ends I provide apparatus as shown in the drawings.

Figure I is a longitudinal vertical section through a filtering or extracting apparatus constructed according to my invention; Fig. II, a transverse section through the same apparatus on the line $x\ x$ in Fig. I; and Fig. III, an enlarged detail of Fig. II, showing the vanes or flights to arrest and divert the water exuding from the material as it descends.

In expressing or extracting liquids from granular or comminuted material when the quantity and circumstances prevent the employment of centrifugal apparatus, the means available are gravity, drainage and pressure, or both, as in the present case. Pressure when applied by mechanical means must be intermittent, expensive, and slow; but when the required pressure is produced by a gravity-head of the substance itself the extracting process becomes continuous and rapid if the head can be maintained. This latter is an essential feature of my invention, the maintenance of a constant gravity-pressure on the saturated material produced by a head of the same that presses with a cumulated force from the top downward and in accordance with the requirements for successful extraction.

Referring to the drawings, 1 is main inclosing chamber resting on a frame 2.

3 is an inner pyramidal space or chamber that contains the crushed ore or other substance to be filtered.

7 is a helical conveyer that at a predetermined or adjustable rate of revolution removes the substance, hereinafter called the "ore," from the bottom approximately at the same rate as it is supplied at the top 5 and is sufficiently drained.

The helical conveyer 7 is driven at different rates of speed by means of the variable-friction gearing shown at 8. The latter being of of a well-known construction does not require description here.

The material after treatment and removal by the helical conveyer 7 falls on an endless-band conveyer 9 or can be removed by any suitable means, as waste or for treatment, as circumstances may demand.

Inside the main chamber 1 are fixed a series of frames 10, and to the inner faces of these frames are attached tiers of horizontal vanes 12, preferably rolled metal bars of a section, as shown in Fig. III. These vanes 12 by their inclination sustain or confine a body of loose and pervious material, preferably coarse sand, placed in the spaces 13 and between the vanes 12. The inward inclination of the sides of the chamber 3 evades to a great extent the arching effect of confined granular material and permits the descent of the ore and its cumulative gravity-pressure from the top to the bottom, the water therein exuding from the mass accordingly. The water thus driven out follows through or between the vanes 12, percolates down through the filtering material placed in the chambers 13, and flows off at the bottom through a pipe 14 for use again, if so required. The cross-chambers 17 form a connection between the spaces 13 at the bottom, as seen in Fig I.

To maintain the head of ore in the chamber 3, a supply is fed in at 5 and an equal quantity is removed at the bottom by the conveyer 7. This requires careful adjustment attained by the variable driving-gearing 8 or other devices of a like nature, as before explained, so the amount removed, even if intermittently, will maintain an approximately uniform head and pressure.

A cock 18 controls the amount of pulp or ore and water admitted and if required the filtering process can be accelerated by pressure applied at the top 5 by means of pumps or an additional head.

When the ore contains chemicals, such as cyanid of potassium, that is not removed by the normal process as described, the ore is saturated near the bottom by means of a retort or chamber 19, filled with water under pressure that is driven out through the perforations 20 and laterally through the ore into the space or chamber 13. If in the latter case the ore is not sufficiently drained or dried, it is again treated by a similar process.

Having thus explained the nature and objects of my invention, what I claim as new, and desire to secure by Letters Patent, is—

1. In a filter for crushed ore, and like substances, a means for sustaining a mass of crushed ore disposed in a vertical column, regulated means to remove ore from the bottom of the column, means to supply fresh ore at the top, to maintain the height of the column approximately constant, and means for draining moisture from the ore at the sides of the descending column, substantially as specified.

2. In a filter, for ore and like substances, a containing-chamber provided with grillework to maintain a mass of ore in pyramidal form, tiers of vanes to hold the filtering material and deflect the water through, which water is forced out by pressure of the superincumbent mass, and means to supply and remove the ore without materially altering the head or depth, substantially as specified.

3. In a filter for crushed ore and like substances, a chamber for sustaining a mass of ore in pyramidal form, inwardly-projecting vanes in said chamber with outlets between, filter-chambers outside of said ore-chamber for containing the filtering material, a conveyer for removing the ore from the bottom in regulated quantities, a variable-speed mechanism for regulating the speed of the conveyer, and means for supplying comminuted ore at the top of the ore-chamber, to maintain the height of the gravity-column, substantially as specified.

In testimony whereof I have signed my name to this specification in the presence of two subscribing witnesses.

BERTRAM HUNT.

Witnesses:
ALFRED A. ENQUIST,
ELMER WICKES.